US010500656B2

United States Patent
Lutz et al.

(10) Patent No.: US 10,500,656 B2
(45) Date of Patent: Dec. 10, 2019

(54) POWER TOOL SYSTEM

(71) Applicant: Robert Bosch GmbH, Stuttgart (DE)

(72) Inventors: Tobias Lutz, Filderstadt (DE); Robin Schuler, Waiblingen (DE); Uwe Engelfried, Ostfildern (DE)

(73) Assignee: Robert Bosch GmbH, Stuttgart (DE)

( * ) Notice: Subject to any disclaimer, the term of this patent is extended or adjusted under 35 U.S.C. 154(b) by 459 days.

(21) Appl. No.: 14/501,231

(22) Filed: Sep. 30, 2014

(65) Prior Publication Data

US 2015/0096419 A1    Apr. 9, 2015

(30) Foreign Application Priority Data

Oct. 8, 2013 (DE) .................. 10 2013 220 233

(51) Int. Cl.
*B23D 57/02* (2006.01)
*B27B 17/00* (2006.01)

(52) U.S. Cl.
CPC .............. *B23D 57/02* (2013.01); *B27B 17/00* (2013.01); *B27B 17/005* (2013.01); *Y10T 83/707* (2015.04)

(58) Field of Classification Search
CPC ....... B23D 57/02; B27B 17/00; B27B 17/005; Y10T 83/707
USPC ................ 83/788–820, 471, 473, 651.1
See application file for complete search history.

(56) References Cited

U.S. PATENT DOCUMENTS

| | | | | |
|---|---|---|---|---|
| 2,774,395 A * | 12/1956 | Tweedie | .................. | B27B 17/02 299/82.1 |
| 3,134,409 A * | 5/1964 | Hayden | ............... | B27B 17/0083 30/371 |
| 3,897,054 A * | 7/1975 | Riggs | ...................... | A63H 13/20 40/415 |
| 3,926,086 A * | 12/1975 | Crane | ................... | B27B 17/005 83/745 |
| 4,111,085 A * | 9/1978 | Johnson | ................. | B23D 53/04 83/801 |
| 4,269,242 A * | 5/1981 | Smith | ....................... | B27L 7/00 144/192 |
| 4,300,428 A * | 11/1981 | Woodland | ............ | B23Q 9/0064 83/522.19 |
| 4,317,285 A * | 3/1982 | Graham | ............... | B27G 19/003 30/371 |
| 4,606,254 A * | 8/1986 | Schmalz | .............. | B23D 53/005 83/435.27 |
| 4,819,335 A * | 4/1989 | Alexander | ............. | B27B 17/14 30/122 |

(Continued)

FOREIGN PATENT DOCUMENTS

FR    2 390 232 A1    12/1978

*Primary Examiner* — Sean M Michalski
(74) *Attorney, Agent, or Firm* — Maginot, Moore & Beck LLP

(57) ABSTRACT

A power tool system includes at least one power tool which has at least one workpiece support unit that is configured to support a workpiece during machining, and also includes at least one machining tool device which extends through a workpiece support surface of the workpiece support unit in at least one operating state. The machining tool device includes at least one cutting strand that is configured to be driven in circulation. A ratio of a maximum height of the workpiece support unit to a maximum cutting depth of the machining tool device is less than 4.1.

9 Claims, 3 Drawing Sheets

(56) References Cited

U.S. PATENT DOCUMENTS

| | | | | | |
|---|---|---|---|---|---|
| 5,046,391 | A * | 9/1991 | Lewis | ............... | B23D 45/024 |
| | | | | | 144/376 |
| 5,213,022 | A * | 5/1993 | Elgan | ............... | B23D 53/04 |
| | | | | | 83/797 |
| 5,239,758 | A * | 8/1993 | Lindell | ............... | B23D 57/0076 |
| | | | | | 30/122 |
| 5,320,016 | A * | 6/1994 | Spath | ............... | B23D 53/04 |
| | | | | | 83/794 |
| 5,497,687 | A * | 3/1996 | Huang | ............... | B26D 1/46 |
| | | | | | 83/174 |
| 5,509,206 | A * | 4/1996 | Rowe | ............... | B23D 53/005 |
| | | | | | 30/380 |
| 5,568,756 | A * | 10/1996 | Peterson | ............... | B23D 45/024 |
| | | | | | 83/471.2 |
| 5,784,941 | A * | 7/1998 | Sanborn | ............... | B27B 17/005 |
| | | | | | 83/471.2 |
| 5,884,545 | A * | 3/1999 | Hamby, Jr. | ............... | B27B 1/002 |
| | | | | | 144/245.2 |
| H001867 | H * | 10/2000 | Quiram | ............... | B23D 51/14 |
| | | | | | 83/13 |
| 6,283,863 | B1 * | 9/2001 | Lang | ............... | B60R 1/074 |
| | | | | | 464/44 |
| 6,832,538 | B1 * | 12/2004 | Hwang | ............... | B26D 1/46 |
| | | | | | 83/651.1 |
| 7,513,048 | B2 * | 4/2009 | De Salles | ............... | B23B 45/003 |
| | | | | | 30/122 |
| 8,186,066 | B2 * | 5/2012 | Doragrip | ............... | A01G 3/053 |
| | | | | | 30/199 |
| 8,261,643 | B2 * | 9/2012 | Cosgrove | ............... | B23D 53/026 |
| | | | | | 29/426.4 |
| 9,457,489 | B2 * | 10/2016 | Fuchs | ............... | B23D 57/023 |
| 2004/0206772 | A1 * | 10/2004 | Leifheit | ............... | A47K 3/281 |
| | | | | | 222/83 |
| 2004/0237742 | A1 * | 12/2004 | Liao | ............... | B23D 45/067 |
| | | | | | 83/473 |
| 2005/0199112 | A1 * | 9/2005 | Ku | ............... | B23D 45/068 |
| | | | | | 83/473 |
| 2005/0205751 | A1 * | 9/2005 | Utsumi | ............... | F02B 61/02 |
| | | | | | 248/674 |
| 2006/0124331 | A1 * | 6/2006 | Stirm | ............... | B25F 5/00 |
| | | | | | 173/178 |
| 2006/0128510 | A1 * | 6/2006 | Masuda | ............... | F16H 9/18 |
| | | | | | 474/8 |
| 2007/0089576 | A1 * | 4/2007 | Aihara | ............... | B23D 55/06 |
| | | | | | 83/13 |
| 2007/0101851 | A1 * | 5/2007 | McIntosh | ............... | B23D 53/006 |
| | | | | | 83/788 |
| 2007/0137456 | A1 * | 6/2007 | Liao | ............... | B23D 53/023 |
| | | | | | 83/788 |
| 2007/0221031 | A1 * | 9/2007 | Watanabe | ............... | B23D 55/06 |
| | | | | | 83/802 |
| 2008/0289473 | A1 * | 11/2008 | Diener | ............... | B23D 53/04 |
| | | | | | 83/799 |
| 2010/0005940 | A1 * | 1/2010 | Clark, II | ............... | F16L 1/202 |
| | | | | | 83/820 |
| 2010/0180739 | A1 * | 7/2010 | Gass | ............... | B23D 59/001 |
| | | | | | 83/58 |
| 2012/0111170 | A1 * | 5/2012 | Steinfort | ............... | B27B 17/0058 |
| | | | | | 83/796 |
| 2013/0306047 | A1 * | 11/2013 | Jonsson | ............... | B23D 59/008 |
| | | | | | 125/21 |
| 2015/0107429 | A1 * | 4/2015 | Ceroll | ............... | B23D 47/025 |
| | | | | | 83/468.7 |
| 2016/0305601 | A1 * | 10/2016 | McQueen | ............... | B08B 1/00 |
| 2018/0073619 | A1 * | 3/2018 | Le Roy | ............... | F16H 55/14 |

* cited by examiner

POWER TOOL SYSTEM

This application claims priority under 35 U.S.C. § 119 to patent application no. DE 10 2013 220 233.4, filed on Oct. 8, 2013 in Germany, the disclosure of which is incorporated herein by reference in its entirety.

BACKGROUND

Power tool systems which at least one power tool which comprise at least one workpiece support unit for supporting a workpiece during machining are already known. Furthermore, the already known power tool systems have a machining tool device which extends through a workpiece support surface of the workpiece support unit in at least one operating state, said machining tool device comprising a cutting strand that is driveable in circulation.

SUMMARY

The disclosure proceeds from a power tool system having at least one power tool which comprises at least one workpiece support unit for supporting a workpiece during machining, and having at least one machining tool device which extends through a workpiece support surface of the workpiece support unit in at least one operating state, said machining tool device comprising at least one cutting strand that is driveable in circulation.

It is proposed that the power tool system have a ratio of a maximum height of the workpiece support unit to a maximum cutting depth of the machining tool device of less than 4.1. Particularly preferably, the power tool is configured as a "benchtop power tool". In this case, the power tool is preferably in the form of a bench saw, an underfloor saw and/or a pull-push saw. However, it is also conceivable for the power tool to have some other configuration that appears appropriate to a person skilled in the art. The power tool has in particular a mass of less than 60 kg, preferably less than 40 kg and particularly preferably less than 30 kg. Preferably, the power tool is configured as a stationary power tool which can be transported by an operator without the use of a transport machine. A "workpiece support unit" should be understood here as meaning in particular a unit which has at least one workpiece support surface on which a workpiece is placeable for machining. Preferably, the workpiece support unit has at least one stop element, in particular a stop bar, against which the workpiece can be placed in order to achieve a precise cut during machining. In particular, a workpiece is positioned and/or mounted on the workpiece support surface of the workpiece support unit for machining by means of the power tool. Particularly preferably, the workpiece support unit is formed by a power tool bench, in particular by a power tool benchtop. In this case, the workpiece support unit is formed in particular from aluminum. However, it is also conceivable for the workpiece support unit to be formed from some other material that appears appropriate to a person skilled in the art. The expression "extend through" is intended to define here in particular an arrangement of one component relative to a further component, wherein the component is arranged in a recess in the further component in at least one operating state and extends beyond at least one peripheral region, bounding the recess, of the further component in at least one operating state. Preferably, the machining tool device extends through the recess in the workpiece support unit in a direction extending at least substantially perpendicularly to the workpiece support surface. The expression "maximum height of the workpiece support unit" is intended to define here in particular a maximum distance, extending in a direction extending at least substantially perpendicularly to the workpiece support surface, from the workpiece support surface to an underlying-surface contact surface of the power tool, for example a power tool frame supporting foot surface. The maximum height of the workpiece support unit is preferably configured as a maximum saw bench height of the power tool. Preferably, in order to machine, when the power tool is being handled properly, the power tool is set down, by way of the underlying-surface contact surface of the power tool, on a suitable surface, for example a worktop and/or a production hall floor, etc.

The expression "maximum cutting depth of the machining tool device" is intended to define here in particular a maximum projection of the machining tool device beyond the workpiece support surface in a direction extending at least substantially perpendicularly to the workpiece support surface. Preferably, the maximum cutting depth of the machining tool device is formed by a distance, as viewed in a direction extending at least substantially perpendicularly to the workpiece support surface, between a cutting edge of a cutting strand and the workpiece support surface. A "cutting strand" should be understood here as meaning in particular a unit which is intended to locally undo atomic cohesion of a workpiece to be machined, in particular by means of a mechanical parting-off process and/or by means of mechanical removal of material particles of the workpiece. The expression "intended" is intended to denote here in particular specially designed and/or specially equipped. Preferably, the cutting strand is intended to separate the workpiece into at least two physically separated parts and/or to at least partially part off and/or remove material particles of the workpiece starting from a surface of the workpiece. Particularly preferably, the cutting strand is movable in circulation along a circumference of a guide unit of the machining tool device relative to the guide unit. A "guide unit" should be understood here as meaning in particular a unit which is intended to exert on the cutting strand a constraining force at least in a direction perpendicular to a cutting direction of the cutting strand, in order to specify a movement capability of the cutting strand in the cutting direction. Preferably, the guide unit has at least one guide element, in particular a guide groove, through which the cutting strand is guided. Preferably, the guide unit is in the form of a guide tongue or guide bar.

The expression "cutting plane" is intended to define here in particular a plane in which the cutting strand is moved, in at least one operating state, along a circumference of the guide unit in at least two cutting directions that are directed in opposite directions to one another, relative to the guide unit. Preferably, when a workpiece is machined, the cutting plane is oriented at least substantially transversely to a workpiece surface to be machined. The expression "at least substantially transversely" should be understood here as meaning in particular an orientation of a plane and/or a direction relative to a further plane and/or a further direction which deviates preferably from a parallel orientation of the plane and/or the direction relative to the further plane and/or the further direction. However, it is also conceivable for the cutting plane to be oriented, when a workpiece is machined, at least substantially parallel to a workpiece surface to be machined, in particular when the cutting strand is configured as a grinding means etc. The expression "at least substantially parallel" should be understood here as meaning in particular an orientation of a direction relative to a reference direction, in particular in a plane, wherein the direction has a deviation in particular of less than 8°, advantageously less than 5° and particularly advantageously less than 2° with respect to the reference direction. A "cutting direction" should be understood here as meaning in particular a direction in which the cutting strand is moved in order to produce a cutting gap and/or to part off and/or to remove material particles of a workpiece to be machined in at least one operating state as a result of a drive force and/or a drive torque relative to the guide unit.

The cutting strand and the guide unit preferably together form a closed system. The expression "closed system" is intended to define here in particular a system which comprises at least two components which retain functionality by means of interaction in a state in which the system is dismounted from a system superordinate to the system, for example a power tool, and/or which are connected captively together in a state dismounted from the power tool, in particular from a tool receptacle of the power tool. Preferably, the at least two components of the closed system are connected together at least substantially in a non-detachable manner for an operator. The expression "at least substantially in a non-detachable manner" should be understood here as meaning in particular a connection of at least two components which can be parted from one another only with the aid of parting tools, for example a saw, in particular a mechanical saw etc., and/or chemical parting means, for example solvents etc. By means of the configuration according to the disclosure, a compact power tool system can advantageously be achieved. As a result of the ratio according to the disclosure of the maximum height of the workpiece support unit to the maximum cutting depth of the machining tool device, a small maximum height of the workpiece support unit at a large maximum cutting depth of the machining tool device can advantageously be realized. Furthermore, in order to machine a workpiece, the power tool system can advantageously be arranged for example on a workbench/on a worktable in order to allow comfortable operation. In addition, a small storage space for storing the power tool system is advantageously necessary. Thus, the power tool system can advantageously be stored in a space-saving manner.

Furthermore, it is proposed that the ratio of the maximum height of the workpiece support unit to the maximum cutting depth is particularly advantageously less than 3.5. Preferably, the ratio of the maximum height of the workpiece support unit to the maximum cutting depth is less than 2.8. In this way, a particularly compact power tool system can be realized.

A particularly advantageous configuration of the power tool system according to the disclosure can be achieved in that the maximum height of the workpiece support unit is less than 235 mm. Preferably, the maximum height of the workpiece support unit is less than 200 mm and particularly preferably less than 180 mm. In this way, a power tool of particularly low construction can advantageously be realized.

Furthermore, it is proposed that the power tool has at least one tool drive shaft which, as viewed in a direction away from the workpiece support surface of the workpiece support unit, is at a maximum distance from a cutting edge of the machining tool device, said maximum distance being less than the maximum cutting depth of the machining tool device, in particular in a state arranged on the tool receptacle. Preferably, the direction away from the workpiece support surface of the workpiece support unit extends at least substantially perpendicularly to the workpiece support surface. The tool drive shaft is preferably intended to drive a tool receptacle of the power tool, in particular to drive it in rotation. In this way, the tool drive shaft is preferably in the form of a rotary shaft, in particular of a rotary shaft of a driving gearwheel. By means of the configuration according to the disclosure, a projection of the machining tool device beyond the tool drive shaft in the direction away from the workpiece support surface of the workpiece support unit can advantageously be kept small. In this way, particularly advantageous compactness of the power tool can be achieved.

In addition, it is proposed that the power tool has at least the tool drive shaft which, as viewed in the direction away from the workpiece support surface of the workpiece support unit, is at a maximum distance from a cutting edge of the machining tool device, said maximum distance being independent of a maximum overall length of the machining tool device, in particular in a state in which the machining tool device is arranged on the tool receptacle. Preferably, the maximum distance from a cutting edge of the machining tool device is independent of an exchange of the machining tool device for a further machining tool device having a maximum overall length that differs from a maximum overall length of the machining tool device. The maximum distance from a cutting edge of the machining tool device is thus preferably unchangeable as a result of a machining tool change. In this way, a small projection of the machining tool device over the tool drive shaft can advantageously be realized, this being independent of a maximum overall length of a machining tool device that is arrangeable on the tool receptacle, in particular advantageously remaining constant with regard to machining tool devices having different lengths.

Furthermore, it is proposed that the power tool has at least one tool receptacle by means of which the machining tool device, in order to machine a workpiece, is fixable to the power tool on one side by means of a form-fitting and/or by means of a force-fitting connection. The expression "fixable on one side" should be understood here as meaning in particular fixing of the machining tool device, in particular of the guide unit, with only one end of the machining tool device on the tool receptacle, in particular fixing against movement in translation and/or in rotation. In this way, components for fixing the machining tool device can advantageously be saved. In addition, a comfortable arrangement and/or fixing of the machining tool device to the tool receptacle can advantageously be enabled. In addition, compactness of the power tool can more advantageously be positively affected, since the machining tool device is arrangeable with a peripheral region of the machining tool device on the tool receptacle, and so a majority of the machining tool device extends through the workpiece support surface.

Furthermore, it is proposed that the machining tool device, when in a state arranged on the power tool, is mounted so as to be movable in translation in a direction extending at least substantially parallel to the workpiece support surface of the workpiece support unit. Particularly preferably, the workpiece support unit has a recess, in particular a slot, within which the machining tool device can move in a fitted state as a result of the movable mounting. A movement of the machining tool device relative to the workpiece support unit in order to introduce a cut into a workpiece to be machined can advantageously be realized. Furthermore, the machining tool device can advantageously be moved onto a workpiece by an operator while the workpiece is fixed relative to the workpiece support unit, in particular at least by means of a stop element of the workpiece support unit.

In addition, it is proposed that the machining tool device, when in a state arranged on the power tool, is mounted so as to be pivotable about a pivot axis extending at least substantially parallel to the workpiece support surface of the workpiece support unit. Preferably, the pivot bearing unit is intended to mount the drive unit in a pivotable manner, starting from a central position, in only one direction through an angle greater than 15°, preferably greater than 30° and particularly preferably greater than 40°. In a favored configuration of the disclosure, the pivot bearing unit is intended to mount the drive unit in a pivotable manner relative to the workpiece support unit, starting from a central position, through an angle less than 50° in only one direction. Preferably, the cutting plane of the cutting strand is moved toward the workpiece support surface of the workpiece support unit in the event of a pivoting movement of the power tool parting device starting from a central position. However, it is also conceivable for the pivot bearing unit to be intended to mount the drive unit in a pivotable manner, starting from a central position, in two opposite directions in each case through an angle greater than 15°, preferably greater than 30° and particularly preferably greater than 40°. A "central position" should be understood here as meaning in particular a position of the machining tool device in which the cutting plane is oriented at least substantially perpendicularly to the workpiece support surface. In an alternative configuration, the pivot axis extends at least substantially perpendicularly to the workpiece support surface of the workpiece support unit. High flexibility during machining of a workpiece can advantageously be achieved by means of the power tool system according to the disclosure, in particular with respect to possible settings for a position of the machining tool device in order to machine a workpiece.

Furthermore, it is proposed that the machining tool device has at least the cutting strand and at least the guide unit for guiding the cutting strand. Preferably, the cutting strand, as viewed in a direction extending at least substantially perpendicularly to the cutting plane of the cutting strand, has a maximum dimension which is smaller than 10 mm. Preferably, the dimension is in the form of the width of the cutting strand. Particularly preferably, the cutting strand, as viewed in the direction extending at least substantially perpendicularly to the cutting plane of the cutting strand, has an at least substantially constant maximum dimension along an overall length of the cutting strand. The maximum dimension corresponds preferably to a value from a range of values from 1 mm to 8 mm along the overall length of the cutting strand. As a result, the power tool parting device, as viewed along an entire extent of the power tool parting device, has an overall width of less than 10 mm. Thus, the cutting strand is preferably intended to produce a cutting gap which, as viewed in the direction extending at least substantially perpendicular to the cutting plane of the cutting strand, has a maximum dimension of less than 10 mm. The guide unit has, preferably together with the cutting strand fitted on the guide unit, as viewed in a direction extending at least substantially parallel to the cutting plane of the cutting strand, a maximum dimension of less than 200 mm. Preferably, the guide unit, together with the cutting strand fitted on the guide unit, as viewed in the direction extending at least substantially parallel to the cutting plane of the cutting strand, has a dimension of less than 150 mm and particularly preferably less than 100 mm. The dimension is preferably in the form of the overall length of the guide unit together with the cutting strand fitted on the guide unit. Advantageously, a high cutting capacity of the machining tool device can be achieved by means of the configuration according to the disclosure.

Furthermore, a power tool of a power tool system according to the disclosure is proposed. By means of the configuration according to the disclosure, a power tool that is particularly convenient to store and to transport can advantageously be realized.

The power tool system according to the disclosure and/or the power tool according to the disclosure should not in this case be limited to the above-described application and embodiment. In particular, the power tool system according to the disclosure and/or the power tool according to the disclosure can have a number of individual elements, components and units which differs from the number mentioned herein in order to fulfill a functionality described herein.

BRIEF DESCRIPTION OF THE DRAWINGS

Further advantages can be gathered from the following description of the drawing. An exemplary embodiment of the disclosure is illustrated in the drawing. The drawing, the description and the claims contain numerous features in combination. A person skilled in the art will expediently also consider the features individually and combine them to form appropriate further combinations.

In the drawings.

DETAILED DESCRIPTION

Figure 1:
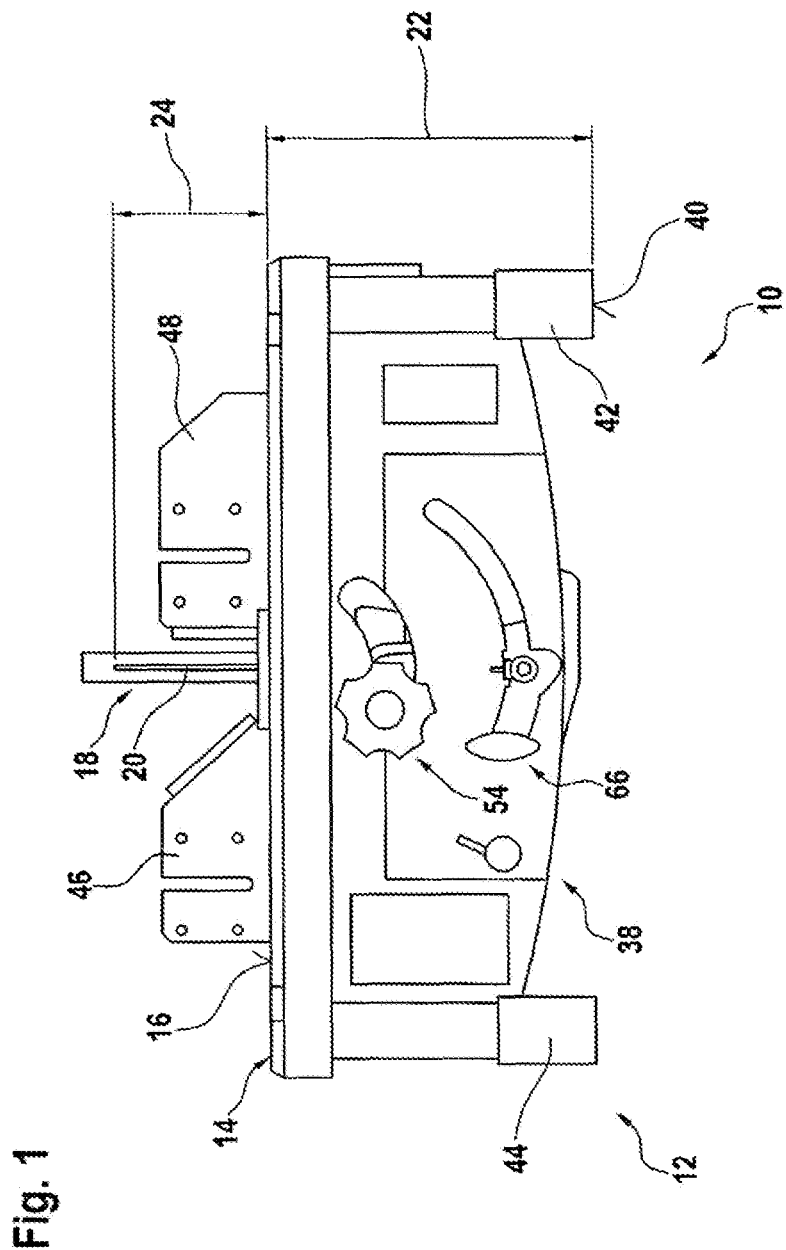
FIG. 1 shows a schematic illustration of a power tool system according to the disclosure having at least one power tool according to the disclosure and having at least one machining tool device.

FIG. 1 shows a power tool system 10 which comprises at least one power tool 12 and at least one machining tool device 18. The power tool 12 is in the form of a bench saw. In this case, the power tool 12 has at least one workpiece support unit 14 for supporting a workpiece during machining. The workpiece support unit 14 is in the form of a tool benchtop. Furthermore, the workpiece support unit 14 is arranged on a basic body unit 38 of the power tool 12. The basic body unit 38 is intended to receive and/or to mount a drive unit 50, a transmission unit 52 and other components and/or units that appear appropriate to a person skilled in the art in order to operate a power tool 12. In order to machine workpieces (not illustrated in more detail here), when the power tool 12 is being handled properly, the power tool 12 can be set down, by way of an underlying-surface contact surface 40 of the power tool 12, on a suitable surface, for example a worktop and/or a production hall floor, etc. To this end, the power tool 12 comprises supporting feet 42, 44 which are arranged on the workpiece support unit 14 and/or on the basic body unit 38 (only two of four supporting feet 42, 44 are illustrated in FIG. 1). Thus, the underlying-surface contact surface 40 is formed by at least one supporting foot surface of a supporting foot of the supporting feet 42, 44. The supporting feet 42, 44 can in this case be formed in a pull-out manner. The workpiece support unit 14 is intended to support a workpiece during machining by means of the machining tool device 18. In this case, the workpiece support unit 14 has at least two stop elements 46, 48 on which a workpiece to be machined is placeable for guiding. The stop elements 46, 48 are arrangeable on a workpiece support surface 16 of the workpiece support unit 14 in an adjustable and/or movable manner by means of guide grooves (not illustrated in more detail here) of the workpiece support unit 14. In addition, the power tool 12 comprises a tool receptacle 32, by means of which the machining tool device 18, in order to machine a workpiece, is fixable to the power tool 12 on one side by means of a form-fitting and/or by means of a force-fitting connection.

The machining tool device 18 extends, in at least one operating state, in particular in a state in which it is arranged on the tool receptacle 32 of the power tool 12, through the workpiece support surface 16 of the workpiece support unit 14. In this case, the workpiece support unit 14 has, in the workpiece support surface 16, a recess (FIG. 2) through which the machining tool device 18 extends through the workpiece support surface 16 at least substantially perpendicularly to the workpiece support surface 16 in a state in which it is arranged on the tool receptacle 32. Furthermore, it is conceivable for the power tool 12 to comprise a protective device (not illustrated in more detail here) which senses a position of a hand of an operator relative to the machining tool device 18 by means of a sensor unit of the protective device and which, in the event of a hazardous situation for the operator, actively brakes a drive of the machining tool device 18 and/or interrupts an energy supply of the drive unit 50.

The machining tool device 18 comprises at least one cutting strand 20 that is driveable in circulation. Furthermore, the machining tool device 18 comprises at least one guide unit 36 for guiding the cutting strand 20. The cutting strand 20 is in this case driveable in circulation, in particular driveable in circulation about the guide unit 36. The drive unit 50 and the transmission unit 52 are operatively connected together in a manner already known to a person skilled in the art in order to produce a drive torque that is transmissible to the machining tool device 18. In this case, the drive unit 50 and/or the transmission unit 52 are intended to be coupled to the cutting strand 20 in a state of the machining tool device 18 in which it is arranged on the tool receptacle 32. The transmission unit 52 is in the form of an angular transmission. The drive unit 50 is in the form of an electric motor unit. However, it is also conceivable for the drive unit 50 and/or the transmission unit 52 to have some other configuration that appears appropriate to a person skilled in the art. Furthermore, it is likewise conceivable for the drive unit 50, uncoupled from the transmission unit 52, to be couplable directly to the machining tool device 18.

In a state of the machining tool device 18 in which it is arranged on the tool receptacle 32, the machining tool device 18 extends, in order to machine a workpiece, in a direction extending at least substantially perpendicularly to the workpiece support surface 16 beyond the workpiece support surface 16. Thus, the machining tool device 18 has, in a state of the machining tool device 18 in which it is arranged on the tool receptacle 32, a projection over the workpiece support surface 16 in a direction extending at least substantially perpendicularly to the workpiece support surface 16. This projection forms a maximum cutting depth 24 of the machining tool device 18 in a state of the machining tool device 18 in which it is arranged on the tool receptacle 32. In this case, the power tool system 10 has a ratio of a maximum height 22 of the workpiece support unit 14 to the maximum cutting depth 24 of the machining tool device 18 of less than 4.1. The ratio of the maximum height 22 of the workpiece support unit 14 to the maximum cutting depth 24 is preferably less than 3.5. The maximum height 22 of the workpiece support unit 14 is formed by a maximum distance of the workpiece support surface 16 from the underlying-surface contact surface 40 in a direction extending at least substantially perpendicularly to the workpiece support surface 16 and/or to the underlying-surface contact surface 40. The maximum height 22 of the workpiece support unit 14 is in this case less than 235 mm. In a preferred configuration of the power tool system 10, the workpiece support unit 14 has a maximum height 22 which has a value from a range of values from 120 mm to 200 mm. The maximum cutting depth 24 of the machining tool device 18 is greater than 40 mm. In a preferred configuration of the power tool system 10, the machining tool device 18 has a maximum cutting depth 24 which has a value from a range of values from 50 mm to 150 mm.

Figure 2:
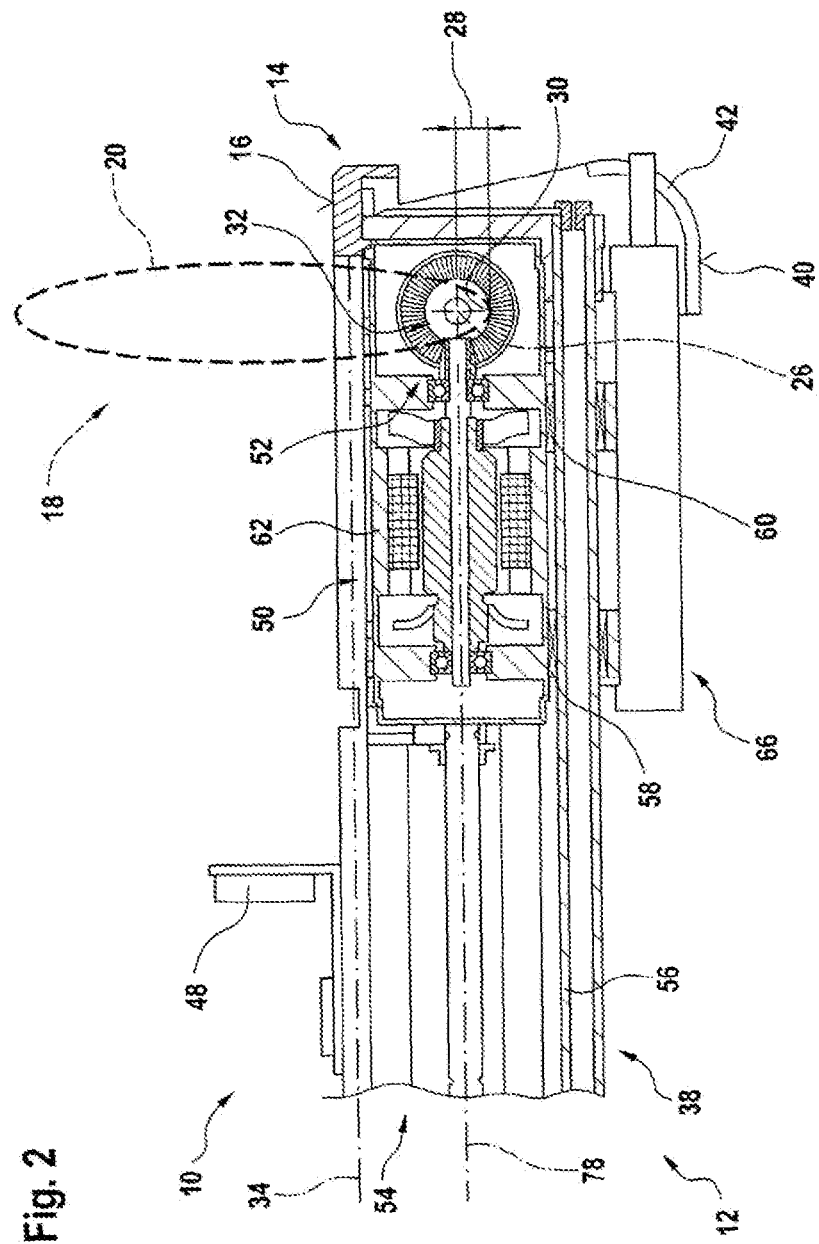
FIG. 2 shows a schematic illustration of a sectional view of the power tool according to the disclosure.

FIG. 2 shows a sectional view of the power tool 12. The power tool 12 comprises at least one tool drive shaft 26 which, as viewed in a direction away from the workpiece support surface 16 of the workpiece support unit 14, has a minimum distance 28 from a cutting edge 30 along a longitudinal axis of the of the machining tool device 18 less than the maximum cutting depth 24 of the machining tool device 18. The minimum distance 28 of the tool drive shaft 26 from a cutting edge 30 of the machining tool device 18 is in this case formed by a maximum projection of the machining tool device 18 in a direction extending away from the workpiece support surface 16 of the workpiece support unit 14 and at least substantially perpendicularly to the workpiece support surface 16. The tool drive shaft 26 is in this case in the form of a rotary shaft of the tool receptacle 32, in particular of a rotary shaft of a driving gearwheel, engaging in the machining tool device 18, of the tool receptacle 32 and/or of the transmission unit 52. In addition, the tool drive shaft 26, as viewed in a direction away from the workpiece support surface 16 of the workpiece support unit 14, has a minimum distance 28 from a cutting edge 30 of the machining tool device 18 independent of a maximum overall length 64 of the machining tool device 18. The minimum distance 28 of the tool drive shaft 26 from a cutting edge 30 of the machining tool device 18 is independent of a tool change of the machining tool device 18 for a further machining tool device which has a maximum overall length that differs from the machining tool device 18. The minimum distance 28 of the tool drive shaft 26 in this case remains constant in terms of its value following a tool change. The tool receptacle 32 is thus configured such that an extent of machining tool devices 18 that are arrangeable on the tool receptacle 32, starting from the tool drive shaft 26, in a direction extending at least substantially perpendicularly to the workpiece support surface 16 and away from the workpiece support surface 16, is independent of a maximum overall length 64 of the particular machining tool device 18. A projection of machining tool devices that are arrangeable on the tool receptacle 32 in a direction extending away from the workpiece support surface 16 of the workpiece support unit 14 and at least substantially perpendicularly to the workpiece support surface 16, said machining tool devices having different maximum overall lengths, is thus the same in terms of length dimension.

Furthermore, in a state in which it is arranged on the power tool 12, the machining tool device 18 is mounted so as to be movable in translation in a direction extending at least substantially parallel to the workpiece support surface 16 of the workpiece support unit 14. In this case, the guide unit 36 is mounted so as to be movable relative to the workpiece support unit 14, together with the cutting strand 20 arranged on the guide unit 36, in a state of the machining tool device 18 in which it is arranged on the tool receptacle 32. The machining tool device 18 is mounted in a linearly movable manner relative to the workpiece support unit 14, together with the drive unit 50 and the transmission unit 52 of the power tool 12, along a movement axis 78 extending at least substantially parallel to the workpiece support surface 16. The power tool 12 has in this case a linear bearing unit 54 which is intended to mount the machining tool device 18, the drive unit 50 and the transmission unit 52 in a linearly movable manner. The linear bearing unit 54 comprises a guide element 56 which is arranged in the basic body unit 38. The guide element 56 is in the form of a guide bar and/or guide rod. Furthermore, the guide element 56 is fixed to the basic body unit 38 by means of fastening elements (not illustrated in more detail here) of the basic body unit 38. Furthermore, the linear bearing unit 54 comprises bearing elements 58, 60 which mount a housing 62 of the linear bearing unit 54 in a linearly movable manner on the basic body unit 38 and/or on the guide element 56. The housing 62 is intended to receive the tool receptacle 32, the drive unit 50 and the transmission unit 52.

Furthermore, the machining tool device 18 is mounted, in a state arranged on the power tool 12, so as to be pivotable about a pivot axis 34 extending at least substantially parallel to the workpiece support surface 16 of the workpiece support unit 14. In the event of a pivoting movement of the machining tool device 18 relative to the workpiece support unit 14, a cutting plane of the cutting strand 20 is tilted relative to the workpiece support surface 16. Starting from a central position of the machining tool device 18, the machining tool device 18 can be pivoted in a direction relative to the workpiece support unit 14. In the central position of the machining tool device 18, the cutting plane of the cutting strand 20 extends at least substantially perpendicularly to the workpiece support surface 16. Starting from the central position, the machining tool device 18 can be pivoted about the pivot axis 34 through an angle of less than 50°. However, it is also conceivable for the machining tool device 18, starting from a central position of the machining tool device 18, to be able to be pivoted in each case through an angle of less than 50° in two opposite directions relative to the workpiece support unit 14.

For pivotably mounting the machining tool device 18, the power tool 12 comprises a pivoting unit 66, by means of which an operator can pivot the machining tool device 18 relative to the workpiece support unit 14. In the event of a pivoting movement, the drive unit 50 and the transmission unit 52 are pivoted about the pivot axis 34 together with the machining tool device 18. To this end, the housing 62 of the linear bearing unit 54 is additionally mounted so as to be pivotable about the pivot axis 34.

Figure 3:
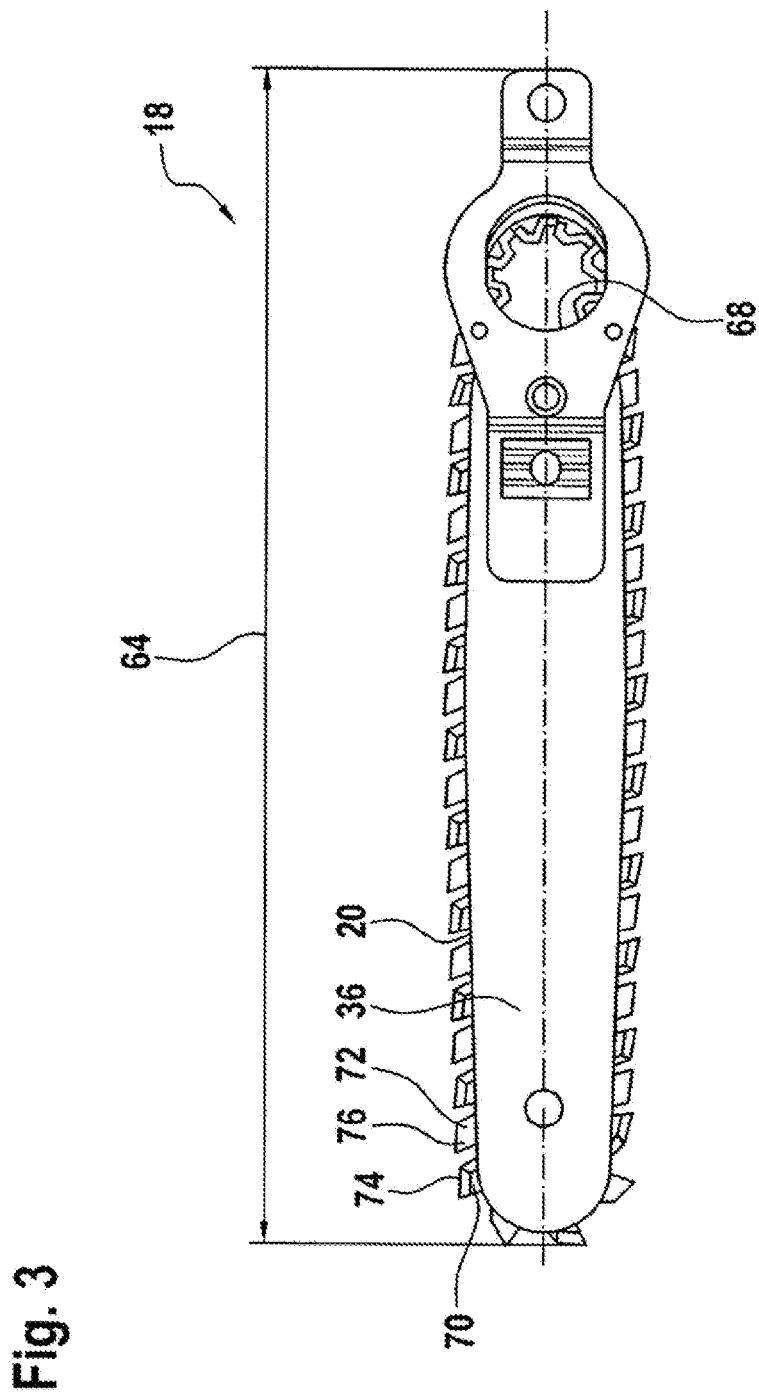
FIG. 3 shows a schematic illustration of a detail view of the machining tool device in a state dismounted from the power tool according to the disclosure.

FIG. 3 shows the machining tool device 18 in a state uncoupled from the tool receptacle 32. The cutting strand 20 and the guide unit 36 together form a closed system. The guide unit 36 is in the form of a guide bar. The cutting strand 20 is guided by means of the guide unit 36 as it moves in circulation about the guide unit 36. To this end, the guide unit 36 has at least one guide element. The guide element of the guide unit 36 is in this case in the form of a guide groove which extends along a circumference of the guide unit 36 in a cutting plane of the cutting strand 20. In this case, the cutting strand 20 is guided by means of peripheral regions, bounding the guide groove, of the guide unit 36. However, it is also conceivable for the guide element of the guide unit 36 to be formed in some other manner that appears appropriate to a person skilled in the art, for example as a rib-like formation on the guide unit 36, said rib-like formation engaging in a recess in the cutting strand 20. As viewed in a plane extending perpendicularly to the cutting plane, the cutting strand 20 is surrounded on three sides by the peripheral regions bounding the guide groove. During operation, the cutting strand 20 is moved in circulation along the circumference in the guide groove relative to the guide unit 36.

Furthermore, the machining tool device 18 has a coupling recess 68 in which a driving gearwheel of the tool receptacle 32 and/or of the transmission unit 52 engages in a state arranged on the tool receptacle 32, said driving gearwheel being connectable in drive terms to the cutting strand 20. However, it is also conceivable for the machining tool device 18 to have a torque transmission element mounted in the guide unit 36, a shaft of the tool receptacle 32 and/or of the transmission unit 52 engaging in said torque transmission element etc. The cutting strand 20 comprises a multiplicity of cutter carrier elements 70, 72 that are connected together, said cutter carrier elements 70, 72 each being connected together by means of a connecting element (not illustrated in more detail here) of the cutting strand 20. Depending on the application case, a person skilled in the art will select a number of cutter carrier elements 70, 72 that is suitable for the cutting strand 20. The cutter carrier elements 70, 72 of the cutting strand 20 each have a recess which is arranged in each case in a mounted state on a side, facing the driving gearwheel, of the particular cutter carrier element 70, 72. In at least one operating state, the driving gearwheel of the tool receptacle 32 and/or of the transmission unit 52 engages in the recesses in order to drive the cutting strand 20. Furthermore, the cutting strand 20 has cutting elements 74, 76. The cutting elements 74, 76 are each formed in one piece with one of the cutter carrier elements 70, 72. However, it is also conceivable for the cutting elements 74, 76 to be formed separately from the cutter carrier elements 70, 72. The number of cutting elements 74, 76 is dependent on the number of cutter carrier elements 70, 72. Depending on the number of cutter carrier elements 70, 72, a person skilled in the art will select a suitable number of cutting elements 74, 76. The cutting elements 74, 76 are intended to allow material particles of a workpiece to be machined to be parted off and/or removed. The cutting elements 74, 76 may be in the form for example of full-chisels, half-chisels or other cutter types that appear appropriate to a person skilled in the art and are suitable for allowing material particles of a workpiece to be machined to be parted off and/or removed. The cutting strand 20 is formed in an endless manner. Thus, the cutting strand 20 is in the form of a cutting chain. The cutter carrier elements 70, 72 are in this case in the form of chain links which are connected together by means of the connecting elements. However, it is also conceivable for the cutting strand 20, the cutter carrier elements 70, 72 and/or the connecting elements to be configured in some other manner that appears appropriate to a person skilled in the art.

What is claimed is:

1. A power tool system, comprising:
    at least one power tool that includes at least one workpiece support unit that is configured to support a workpiece during machining; and
    at least one machining tool device which extends through a workpiece support surface of the at least one workpiece support unit in at least one operating state, the at least one machining tool device including at least one cutting strand that is configured to be driven in circulation;

wherein a ratio between a maximum distance, extending in a direction extending at least substantially perpendicularly to the workpiece support surface, from the workpiece support surface to an underlying-surface contact surface of the power tool and a maximum cutting depth of the at least one cutting strand is less than 4.1:1 and more than 0.8:1, wherein the at least one machining tool device includes at least one guide unit which extends at least partially through the workpiece support surface in the at least one operating state and is configured to guide the at least one cutting strand, wherein the at least one power tool includes at least one tool receptacle that, for machining a workpiece, is configured to fix the at least one machining tool device to the at least one power tool via at least one of a form-fitting connection and a force-fitting connection.

2. A power tool system, comprising:
at least one power tool that includes at least one workpiece support unit that is configured to support a workpiece during machining; and
at least one machining tool device which extends through a workpiece support surface of the at least one workpiece support unit in at least one operating state, the at least one machining tool device including at least one cutting strand that is configured to be driven in circulation;
wherein a ratio between a maximum distance, extending in a direction extending at least substantially perpendicularly to the workpiece support surface, from the workpiece support surface to an underlying-surface contact surface of the power tool and a maximum cutting depth of the at least one cutting strand is less than 4.1:1 and more than 0.8:1, wherein the at least one machining tool device includes at least one guide unit which extends at least partially through the workpiece support surface in the at least one operating state and is configured to guide the at least one cutting strand, wherein the at least one cutting strand and the at least one guide unit are configured as a closed system.

3. The power tool system according to claim 2, wherein the ratio is less than 3.5:1.

4. The power tool system according to claim 2, wherein the maximum distance is less than 235 mm.

5. The power tool system according to claim 2, wherein:
the at least one power tool has at least one tool drive shaft;
the at least one tool drive shaft is spaced apart from the at least one cutting strand by a minimum distance along a longitudinal axis of the at least one machining tool device; and
the minimum distance is less than the maximum cutting depth of the at least one cutting strand.

6. The power tool system according to claim 2, wherein:
the at least one cutting strand comprises a plurality of cutting strands;
each of the plurality of cutting strands defines a respective maximum cutting depth;
each of the respective maximum cutting depths is a depth different from the other of the respective maximum cutting depths;
the at least one power tool includes at least one tool drive shaft;
the at least one tool drive shaft is spaced apart from each of the plurality of cutting strands by a respective minimum distance along a longitudinal axis of the at least one machining tool device when each of the plurality of cutting strands is mounted on the at least one tool drive shaft; and
each of the respective minimum distances is the same as the other of the respective minimum distances.

7. The power tool system according to claim 2, wherein the at least one power tool includes at least one tool receptacle that, for machining a workpiece, is configured to fix the at least one machining tool device to the at least one power tool via at least one of a form-fitting connection and a force-fitting connection.

8. The power tool system according to claim 2, wherein the at least one machining tool device, when positioned on the at least one power tool, is mounted so as to be movable in translation in a direction extending at least substantially parallel to the workpiece support surface.

9. The power tool system according to claim 2, wherein the at least one machining tool device, when positioned on the at least one power tool, is mounted so as to be pivotable with respect to the at least one power tool about a pivot axis extending at least substantially parallel to the workpiece support surface.

* * * * *